United States Patent Office 3,339,512
Patented Sept. 5, 1967

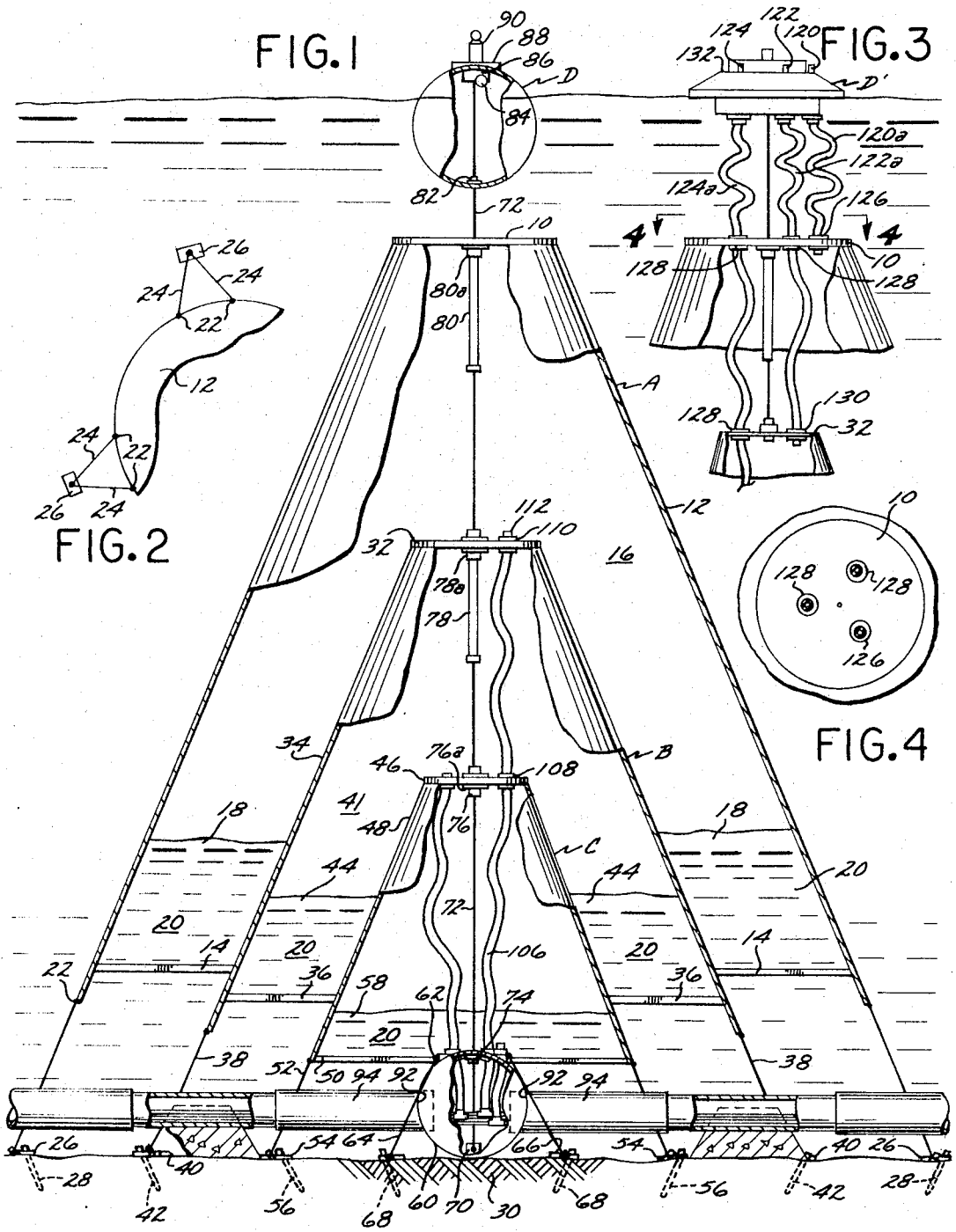

3,339,512
MULTIPLE STORAGE AND REDISTRIBUTION
FACILITY
Gilbert Siegel, 12282 Moana Way,
Garden Grove, Calif. 92640
Filed June 17, 1966, Ser. No. 558,443
8 Claims. (Cl. 114—.5)

The present invention relates generally to the storage of liquids, and more particularly to an off-shore multiple storage and redistribution facility for liquids of a lesser specific gravity than that of water, as well as the storage of gases that are relatively insoluble in water.

Heretofore the storage of liquids used in the petroleum, chemical, mining, and like industries in coastal areas has been, in the majority of instances, accommodated in land-based tanks. Unfortunately, such tanks have been located on increasingly scarce and expensive land, which to a degree, renders the property unsightly, and creates a major fire and explosive hazard if the stored liquids are of an inflammable nature.

A major object of the present invention is to provide off-shore storage means for liquids of a lesser specific gravity than that of water which will be concealed, and with the liquid stored therein presenting no appreciable fire hazard for it is at all times during storage submerged in water.

Another object of the invention is to supply liquid storage facilities of a relatively simple structure which can be moved from one location to another as required and will free valuable and expensive land along coastal areas for more economically productive uses.

A further object of the invention is to furnish multi-compartmented underwater facilities for the storage of different liquids without contamination thereof, with such facilities being usable in bodies of water in which relatively strong currents prevail.

Yet another object of the invention is to provide liquid storage facilities not adversely susceptible to the effects of earth-generated shocks, high winds, wave action, typhoons, or the like, and can be easily adapted for use with existing terminal facilities, and other off-shore installations.

A still further object of the invention is to provide liquid storage facilities which are safer and accessible to oceangoing vessels of substantial draft, and due to the location thereof, these facilities minimize the distance stored liquids would have to be pumped during loading or unloading from a ship.

Still another object of the invention is to provide submerged liquid storage facilities of such design as to minimize the force of normally encountered currents, and from which liquid stored therein can be loaded or unloaded through either top or bottom feeder lines for convenient storage or distribution.

Another object of the invention is to provide offshore liquid storage facilities in which lines leading thereto are enveloped in lightweight cylindrical, slip-fit modules, which facilities are adapted to be installed without the use of heavy equipment such as seagoing derricks, cranes, and the like.

Yet another object of the invention is to furnish a submerged offshore liquid storage facility that is protected from marine growth and corrosion by means of a spirally wound, nonmetallic material which may be periodically removed from the facility, together with all barnacles, etc., and then replaced.

Another object of the invention is to provide a facility to which ships can moor and thereby eliminate damage to submarine lines due to drag.

A further object of the invention is to supply a storage facility that is maintained at a relatively constant temperature and one which minimizes loss of stored liquid by evaporation.

These and other objects and advantages of the invention will become apparent from the following description of first and second forms thereof, and from the accompanying drawing illustrating the same, in which:

FIGURE 1 is a combined, side elevation and vertical cross sectional view of a first form of a storage facility;

FIGURE 2 is a fragmentary top plan view of the facility shown in FIGURE 1, taken on the line 2—2 thereof;

FIGURE 3 is a fragmentary, side elevational and vertical cross-sectional view of a second form of the storage facility;

FIGURE 4 is a top plan view of the second form of the device, taken on the line 4—4 thereof.

With continuing reference to FIGURES 1 and 2 of the drawing for the general arrangement of the first form of the invention, it will be seen that three frusto-conical containers A, B and C of decreasing volume are provided which are disposed one above the other and submerged in a natural body of water.

Container A comprises a circular rigid top 10, from the peripheral edge of which a continuous side wall 12 extends downwardly and outwardly to terminate in a stiffener ring 14. Container A is radially spaced from container B by a space 16, which space may be filled by a liquid 18 of lesser specific gravity than that of water 20, or by liquid 18 floating on a layer of water 20.

A number of circumferentially spaced eyes 22, or other fastening means, are affixed to the stiffener ring 14, from which eyes pairs of cables 24 lead downwardly to tie-down plates 26 to which they are attached, as shown in FIGURE 2. Elongate rigid members 28 extend through openings (not shown) formed in plates 26, and are driven into the marine bottom 30 of the body of water in which the storage facility is located.

Container B includes a circular top 32 from which a frusto-conical side wall 34 extends downwardly to develop into a lower stiffener ring 36. Pairs of cables 38 lead downwardly from ring 36 in the same pattern as that of cables 24, and are secured to tie-down plates 40, which are in turn secured to the marine bottom by elongate rigid members 42. Container B is separated from container C by a space 41, which can be occupied by a liquid 44 of lesser specific gravity than that of water, or by layers of water 20 and liquid 44.

The container C includes a circular top 46, from which a frusto-conical side wall 48 depends at an outward angle to terminate in a stiffener ring 50. Pairs of tie-down cables 52 extend from ring 50 that are secured to tie-down plates 54, which plates in turn, the secured to the marine bottom 30 to rigid elongate members 56. The container C is adapted to store therein a liquid 58 of lesser specific gravity than that of water, or layers of liquid 58 and water 20. Liquids 18, 44 and 58 must be immiscible with water if they are to be stored in the containers A, B and C described herein.

When filled with liquid 18, 44 and 58, the containers A, B and C respectively, are buoyantly supported thereby and assume the configuration shown in FIGURE 1 wherein the cables 24, 38 and 52 are under tension. The length of cables 24, 38 and 52 is so selected that the buoyantly supported containers A, B and C are disposed a substantial distance above the bottom 30. A hollow spherical body 60 is disposed below container C (FIGURE 1), and a number of circumferentially spaced lugs 62 are affixed to the upper ring portion thereof, from which tie-down cables 64 extend to tie-down plates 66 resting on the marine bottom 30.

The tie-down plates 66 are held in fixed positions on the bottom 30 by a number of elongate, rigid members 68 which are sunken therein. A lug 70 is provided in the lower interior surface of the sphere or body 60 from which a cable 72 extends upwardly to a guide 74.

The cable, as best shown in FIGURE 1, also extends upwardly through guides 76, 78 and 80 that are supported from the tops 46, 32, and 10 respectively. Guides 76, 78 and 80 include resilient seals 76a, 78a and 80a respectively, which slidably engage cable 72. The purpose of seals 76a, 78a and 80a is to prevent upward movement of the liquids 50, 44 and 18 respectively from the containers in which they are stored, for such upward movement would result in contamination of these liquids.

The cable 72 is preferably coated with an anti-friction material (not shown) such as nylon, or the like, to minimize wear and to provide a consistent sealing surface on the cable as it passes through the guides 76, 78 and 80. In passing through buoy D (FIGURE 1), the cable 72 extends through a resilient guide and seal 82 disposed at the lower interior of the buoy. The upper end portion of cable 72 engages a reel 84 forming a part of a conventional power-driven winch 86 mounted on the upper interior surface of the buoy D for protection against weather and wave action.

The winch assembly 86 is energized by conventional power means such as an electric motor, or the like (not shown). A platform 88 is provided on the upper exterior surface of buoy D, which supports a warning light assembly 90 of conventional design. Energization of the winch assembly 86 causes the cable 72 to be either wound on, or unwound from the reel 84 to permit the buoy D to rise with the tide above the surface of the body of water in which the storage facility is located.

Two oppositely disposed, horizontally aligned openings 92 are formed in the hollow spherical body 60 that are slidably engaged by cylindrical modules 94. The interior of the outer ends of the modules 94 are slidably engaged by cylindrical modules 96 which are smaller in diameter than that of modules 94, with modules 96 being slidably engaged by modules 94. Alternate modules 94 and 96 cooperatively define elongate spaces 98 of desired length.

Situated in the spaces 98 are adjacently disposed pipelines 100, 102 and 104. Pipeline 100 within the confines of the spherical body 60 is provided with a T connection 100a, from which a flexible conduit 106 extends upwardly to pass through seals 108 and 110 provided in the tops 46 and 32, respectively.

The conduit 106 terminates in a discharge nozzle 112 that is in communication with the space 16, as shown in FIGURE 1. Pipeline 102 includes a T connection 102a located within the interior of the spherical body 60, from which a conduit 113 extends upwardly through a seal 114 formed in top 46 to communicate with the interior of container B in which liquid 44 is stored. The pipeline 104 has a T 104a therein that is also located inside body 60, and a conduit 116 is connected to T 104a that extends upwardly to a seal 118 formed in the upper portion of the body, with the conduit being in communication with the interior of container C in which liquid 58 is stored.

It will be particularly noted that there is substantial slack in the conduits 106, 113 and 116, which permits movement of the containers A, B and C relative to the action of currents and container vertical movement in the body of water in which the storage facility is submerged.

The pipelines 100, 102 and 104 downstream of the T's 100a, 102a or 104a may be obstructed by valve means (not shown), and when the valve means are closed the liquids 18, 44 and 58 may be discharged into the containers A, B and C to displace water 20 that had previously been therein. When it is desired to remove liquid 18, 44 or 58 from the containers A, B or C, the above operation is simply reversed. Flow meters and level sensors are considered inherent in the valve means.

The space 98 within the modules 94 and 96 is necessarily flooded with water at all times, as is the interior of the spherical body 60. The cylindrical modules 94 and 96 may be relatively large in diameter, sufficient to permit a diver to pass therethrough to inspect the condition of the pipelines 100, 102 and 104. Modules 94 and 96 serve not only to protect the pipelines 100, 102 and 104 from physical contact with objects that could possibly break or fracture the same, but inhibit marine growth on the exterior surface of the pipelines.

It will be particularly noted in FIGURE 1, that the liquid storage facility described herein will be relatively stable in waters in which strong currents occur, for normally these currents will exert the greatest force near the surface of the body of water in which the facility is submerged. The stronger currents will encounter the upper portion of the container A, which presents a minimum frontal area, with the slower moving currents contacting the lower portion of the container, which is of greater area.

The second form of the invention shown in FIGURES 3 and 4 is structurally identical to the first form previously described, other than that the buoy D is replaced by a buoy D'. The buoy D' is provided with three hose connections 120, 122, 124 mounted on the upper portion thereof, from which flexible hoses 120a, 122a and 124a extend downwardly. Hose 120a leads to a tubular seal 126 supported on the top 10, and is in communication with the upper interior portion of container A. Hose 122a extends downwardly through a seal 128 mounted on the top 10 to terminate in a connection 130 supported in the top 32. Connection 130 is in communication with the upper interior of container B.

Hose 124a leads downwardly through two second seals 120a provided in the tops 10 and 32 respectively, as best seen in FIGURE 3, to communicate with the upper interior of shell C. By use of the hose connections 120, 122 or 124, liquids of a lesser specific gravity than that of water can be discharged into or removed from containers A, B and C. The hose connections 120, 122 and 124 are provided with valves (not shown) in the conventional manner. The configuration of the buoy D' is preferably cylindrical to provide a deck 132 whereby the hose connections 120, 122 and 124 are more readily accessible.

If desired, the exterior surfaces of the containers A, B and C may be spirally wrapped with a non-metallic sheet material 134, such as plastic, on which marine growth will occur. When marine growth has accumulated to excess, the spiral wrap 134 may be unwound from its container, and in this manner the marine growth easily freed therefrom. After removal, the spiral wrap 134 may be replaced by a new wrap of the same character.

Although the present invention is fully capable of achieving the objects and providing the advantages hereinbefore mentioned, it is to be understood that it is merely illustrative of the presently preferred embodiments thereof and I do not mean to be limited to the details of construction shown and described, other than as defined in the appended claims.

I claim:

1. A storage facility for a first liquid immiscible with water and of lesser specific gravity, which facility is at all times submerged in a natural body of water and includes:
  (a) a first frusto-conical container for said liquid having a top and a continuous side wall that tapers downwardly and outwardly therefrom, with said container being open at the bottom;
  (b) circumferential reinforcing means on the lower portion of said side wall;
  (c) a plurality of circumferentially spaced tie-down cables depending from said reinforcing means;
  (d) first means for anchoring the lower ends of said tie-down cables below the floor of said body of water;
  (e) a hollow body disposed below said container;
  (f) a first cable extending upwardly from said body;
  (g) a buoy secured to the upper end of said first cable;

(h) first combined guide and sealing means in said top through which said first cable extends;

(i) a first pipeline for carrying said first liquid, which pipeline extends through oppositely disposed openings formed in said hollow body;

(j) a flexible first conduit in communication with said first pipeline within said hollow body, which first conduit extends upwardly through said hollow body to communicate with the interior of said first container, with said first pipeline and first conduit cooperating to permit said first liquid to be discharged into or withdrawn from the interior of said container and said first liquid prior to filling said first container and lending sufficient buoyancy thereto as to at all times tend to urge said first container upwardly and maintain tension on said tie-down cables.

2. A storage facility as defined in claim 1 wherein said tie-down cables are arranged in pairs, with said cables in each pair extending downwardly and inwardly towards one another, and said first means further includes:

(k) a plurality of tie-down plates to which the lower ends of said tie-down cables are secured; and (l) a plurality of elongate rigid members which engage said plates and the floor of said body of water.

3. A storage facility as defined in claim 1 which further includes:

(k) a first hose connection on said buoy;

(l) a first flexible hose in communication with said connection and the upper interior of said first container to permit said first liquid to be discharged into said container or withdrawn therefrom.

4. A storage facility as defined in claim 1 which further includes:

(k) a protective layer of nonmetallic material that covers the exterior surface of said first container and to which marine growth will adhere, which material together with any marine growth attached thereto may be periodically stripped from said container.

5. A storage facility as defined in claim 1 which further includes:

(k) a plurality of rigid cylindrical modules that are slip-fit in end-to-end relationship and encase said pipeline, with two of said modules slidably engaging said openings in said hollow body, which modules and said hollow body are at all times flooded with water from said body.

6. A storage facility as defined in claim 1 which further includes:

(k) a second frusto-conical container of the same structure as that of said first container but substantially smaller in size, with said second container being disposed within said first container, which first and second containers cooperatively define a first confined space therebetween that is in communication with said first conduit and said first confined space holds and stores said first liquid;

(l) a second pipeline adjacent said pipeline for carrying a second liquid of lesser specific gravity than that of water, which liquid is immiscible with water;

(m) means for holding said second container in spaced relationship with said first container; and (n) a flexible second conduit that is in communication with said second pipeline within said hollow body and the interior of said second container to permit discharge of said second liquid into said second container or removal therefrom.

7. A storage facility as defined in claim 1 which further includes:

(k) a plurality of frusto-conical second containers of the same structure as that of said first container but substantially smaller in diameter which are spaced from one other and from said first container;

(l) a plurality of second pipelines adjacent to said first pipeline for carrying different liquids of lesser specific gravity than that of water which are immiscible therewith;

(m) means for maintaining said containers in said spaced relationship one above the other;

(n) a plurality of second conduits in communication with said second plurality of pipelines, the spaces between said containers, and the interior of the lowermost of said containers to permit selective discharge of said different liquids to said spaces between said containers and the interior of the lowermost of said containers and withdrawal therefrom.

8. A storage facility as defined in claim 7 which further includes:

(o) a plurality of second hose connections on said buoy; and (p) a plurality of second flexible hoses in communication with said connections, said spaces between said second containers, and the interior of the lowermost of said second containers to permit selective discharge of said different liquids into said spaces or withdrawal therefrom.

References Cited
UNITED STATES PATENTS

| | | | |
|---|---|---|---|
| 1,201,051 | 10/1916 | Jack | 114—.5 |
| 1,859,322 | 5/1932 | Wilson | 114—.5 |

MILTON BUCHLER, *Primary Examiner.*

T. M. BLIX, *Assistant Examiner.*